(12) United States Patent
King

(10) Patent No.: US 6,215,070 B1
(45) Date of Patent: Apr. 10, 2001

(54) ELECTRIC POWER CABLES

(75) Inventor: Stephen Maurice King, Sevenoaks (GB)

(73) Assignee: Pirelli Cables (2000) Limited, Merseyside (GB)

( * ) Notice: Subject to any disclaimer, the term of this patent is extended or adjusted under 35 U.S.C. 154(b) by 0 days.

(21) Appl. No.: 09/230,565

(22) PCT Filed: Sep. 26, 1997

(86) PCT No.: PCT/GB97/02643

§ 371 Date: Jan. 28, 1999

§ 102(e) Date: Jan. 28, 1999

(87) PCT Pub. No.: WO98/14960

PCT Pub. Date: Apr. 9, 1998

(30) Foreign Application Priority Data

Sep. 30, 1996 (GB) .................................................. 9620394

(51) Int. Cl.⁷ .................................................. H01B 7/00
(52) U.S. Cl. .................................. 174/110 R; 174/120 R; 174/106 R
(58) Field of Search .................. 174/120 R, 120 SR, 174/113 R, 110 R, 110 AR, 36, 106 SC, 120 SC

(56) References Cited

U.S. PATENT DOCUMENTS

| | | | |
|---|---|---|---|
| Re. 36,307 | * 9/1999 | Marin et al. .................. | 174/23 R |
| 3,321,572 | 5/1967 | Garner ........................ | 174/105 |
| 4,125,739 | 11/1978 | Bow .......................... | 174/36 |
| 4,145,567 | 3/1979 | Bahder et al. ................ | 174/107 |
| 4,256,921 | 3/1981 | Bahder ....................... | 174/107 |
| 4,533,789 | 8/1985 | Katz ......................... | 174/102 R |
| 4,703,134 | 10/1987 | Uematsu ...................... | 174/106 SC |
| 4,731,504 | * 3/1988 | Achille et al. ............... | 174/107 |
| 4,986,372 | 1/1991 | Ganssle ...................... | 174/106 SC |
| 5,010,209 | 4/1991 | Marciano-Agostinelli et al. .. | 174/23 C |
| 5,043,538 | * 8/1991 | Hughey, Jr. .................. | 174/107 |
| 5,082,719 | * 1/1992 | Arroyo ....................... | 174/23 |
| 5,146,046 | * 9/1992 | Arroyo et al. ................ | 174/23 R |
| 5,170,010 | * 12/1992 | Aldissi ...................... | 174/36 |

(List continued on next page.)

FOREIGN PATENT DOCUMENTS

| | | |
|---|---|---|
| 0 209 899 | 1/1987 | (EP) . |
| 1035564 | 4/1953 | (FR) . |
| 1485130 | 6/1966 | (FR) . |
| 2465301 | 9/1979 | (FR) . |
| 2538941 | 7/1984 | (FR) . |
| 632657 | 11/1949 | (GB) . |
| 1136912 | 12/1968 | (GB) . |
| 0410307 | 2/1992 | (JP) . |
| WO 98/14960 | 4/1998 | (WO) . |

*Primary Examiner*—Kristine Kincaid
*Assistant Examiner*—William H Mayo, III
(74) *Attorney, Agent, or Firm*—Blank Rome Comisky & McCauley

(57) ABSTRACT

An electric power cable of the kind having at least one metallic conductor, optionally conductor screen of semiconductive material, and insulation all enclosed in an earth screen having wires or narrow tapes and a sheath comprising polymeric material is characterised by a sheath construction comprising a first extruded polymeric layer which encloses the earth screen of the cable without filling the gaps between the components thereof (the wires or strips). A second extruded polymeric layer encloses the first and a moisture barrier laminate is located between them and bonded to both of them. The laminate has a metal foil layer coated on each of its major faces with a polymeric material compatible with the material of the extruded layer it contacts. This increases the resistance of the cable to impact, compared with constructions in which a moisture barrier foil layer is applied directly over the screen wires, and allows the cable to be used in applications that hitherto required a metal sheath.

18 Claims, 1 Drawing Sheet

U.S. PATENT DOCUMENTS

| | | | |
|---|---|---|---|
| 5,249,248 | * | 9/1993 | Arroyo et al. .................. 385/113 |
| 5,281,757 | * | 1/1994 | Marin et al. .................. 174/23 R |
| 5,293,001 | | 3/1994 | Gebs .................. 174/36 |
| 5,300,733 | | 4/1994 | Uematsu .................. 174/106 SC |
| 5,373,100 | * | 12/1994 | Arroyo et al. .................. 174/23 R |
| 5,486,648 | * | 1/1996 | Chan et al. .................. 174/23 R |
| 5,614,269 | * | 3/1997 | Hoskins et al. .................. 427/512 |
| 5,756,159 | * | 5/1998 | Hoskins et al. .................. 427/394 |

\* cited by examiner

ELECTRIC POWER CABLES

BACKGROUND OF THE INVENTION

This invention relates to electric power cables of the kind having at least one metallic conductor, usually a conductor screen of semiconductive material, and insulation all enclosed in an earth screen comprising wires or narrow tapes and an external sheath comprising polymeric material which will usually (but not necessarily) form the exposed surface of the cable.

In most environments, it is desirable, if not essential, that the sheath is more effectively watertight than can be achieved with polymeric material alone, and attempts have thus been made to follow the practice used in communications cables of including a metal/plastics laminate foil beneath the main body of the sheath, so as to become bonded to it, normally when the main polymeric body is extruded. It is difficult, with such structures, to design a sheath in which the laminate foil remains intact when the cable is subjected to the impact tests specified by Standards Authorities and customers, as the laminate tends to be driven into the gaps between the wires or tapes of the screen and to split along resulting crease lines.

SUMMARY OF INVENTION

The cable in accordance with the present invention is characterised by a sheath construction comprising a first extruded polymeric layer which encloses the earth screen of the cable without filling the gaps between the components thereof (the wires or strips), a second extruded polymeric layer enclosing the first and between them and bonded to both of them a moisture barrier laminate comprising a metal foil layer coated on each of its major faces with a polymeric material compatible with the material of the extruded layer it contacts.

Preferably the extruded polymeric layers are of the same material, or at least adhesively compatible materials, and the both faces of the laminate are coated with a single polymeric material which is the same as or compatible with the material(s) of the extruded layers, so that the laminate may self-bond where its edges overlap.

More specifically, we prefer that the two extruded layers of the sheath and the coating on each face of the laminate are all of polyethylene, or alternatively all of polyvinyl chloride or all of an "LSF" composition based on ethylene-vinyl acetate copolymer or an ethylene-propylene rubber (in each case with conventional additives).

The laminate is preferably longitudinally applied, but could be helically lapped if desired.

Preferably the insulation of the cable is of a polymeric material, such as crosslinked polyethylene or ethylene-propylene rubber, and in this case the conductor screen is preferably of carbon-loaded polymeric material and the earth screen preferably includes an inner layer of carbon-loaded conductive polymeric material, in addition to the wires or strips of metal.

Preferably the gaps between the wires or strips of the earth screen are waterblocked by applying water-swellable tapes under and/or over them, or in other known ways. Preferably at least one semiconductive water-swellable tape is applied under the wires or tapes and at least one insulating water-swellable tape over the top of them. A waterblocking tape applied over the wires or tapes may facilitate ensuring that the first extruded layer of the sheath does not fill the gaps between them. Other suitable tapes could be used for this purpose if desired.

Because the laminate is bonded to both the adjacent extruded polymeric layers, no water leakage path is formed adjacent either of its faces and the laminate is given strong and resilient mechanical support, while the inner extruded layer can deform under impact to penetrate (temporarily at least) between the wires or tapes of the earth screen to absorb impact with minimal distortion of the laminate.

BRIEF DESCRIPTION OF THE DRAWINGS

The invention will be further described, by way of example, with reference to the accompanying drawings in which.

DETAILED DESCRIPTION OF THE PREFERRED EMBODIMENT

Figure 1:
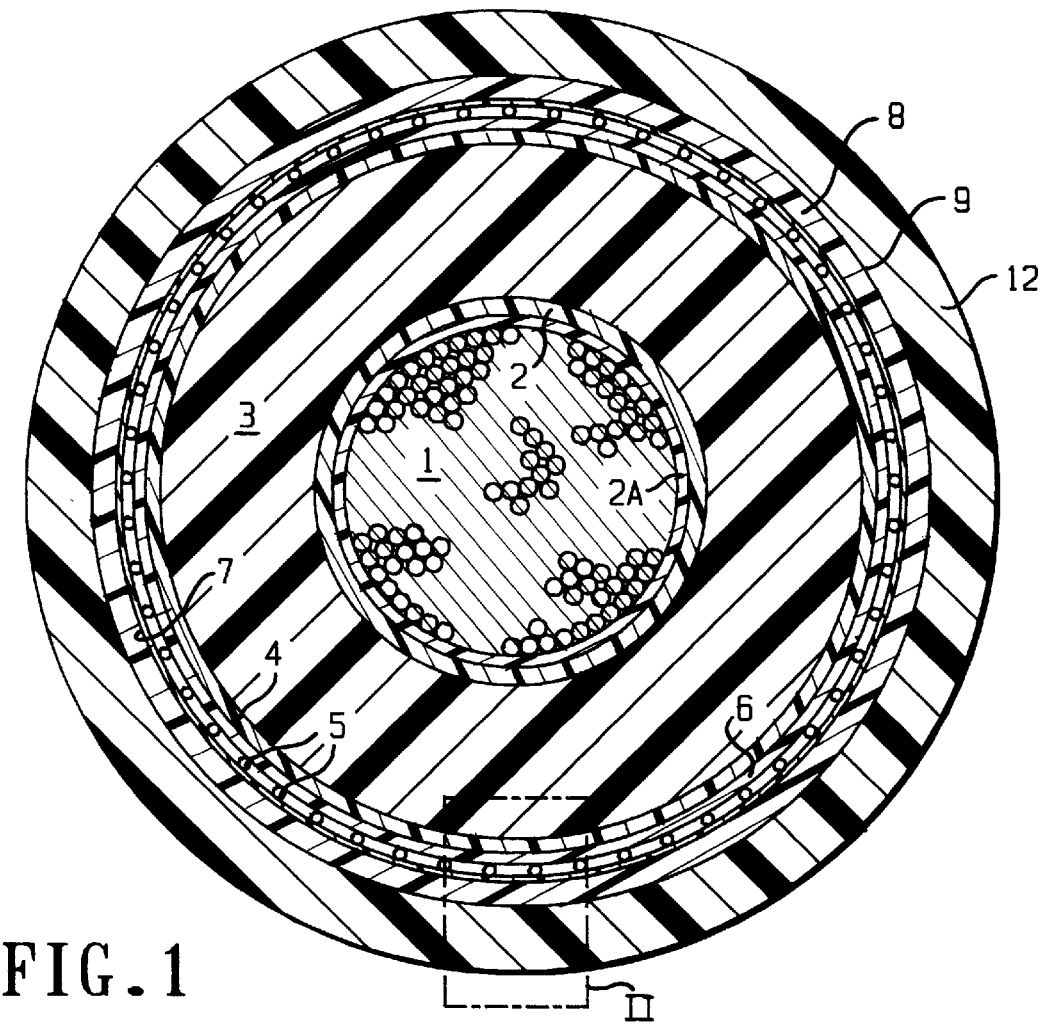
FIG. 1 is a diagrammatic cross-section of one form of single-core cable in accordance with the invention and FIG. 2 is an enlargement of the portion of FIG. 1 enclosed by the box II.
Figure 2:
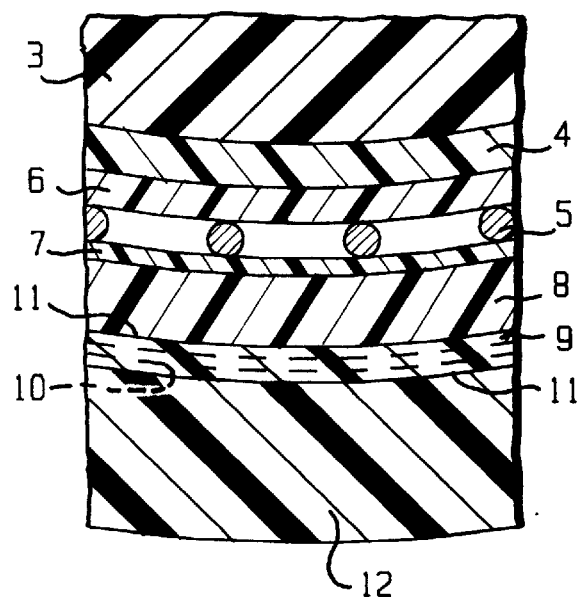

The cable of the example has a stranded plain annealed copper conductor 1, a semiconductive conductor screen 2 applied over a binder tape 2A, crosslinked polyethylene insulation 3 and a dielectric screen comprising an inner semiconducting layer 4 (which may be "fully bonded" or "strippable") and a layer of copper wires 5, all of which are conventional. A semiconducting water-swellable tape 6 under the wires and an insulating water-swellable tape 7 over them provide longitudinal water-blocking for the gaps between the wires. In accordance with the invention, this conventional part of the cable 1 is enclosed in a sheath comprising a first extruded layer of polyethylene 8, a longitudinally applied tape 9 with a central layer 10 of aluminium coated on both sides with polythylene 11, and a second extruded layer of polyethylene 12. The conditions and die dimensions for the extrusion of the first layer of the sheath are such that the layer is "tubed" and does not embed the wires of the screen to any substantial extent. The temperature at which this second layer is applied is high enough to ensure that the laminate is adhesively bonded not only to the second polyethylene layer but to the first layer as well.

In a particular example constructed as just described, a copper conductor of 300 mm$^2$ (made up of 59 round wires each 2.6 mm in diameter) is covered with a conventional semiconducting screen material to a nominal radius of 25.3 mm. The crosslinked polyethylene insulation has a radial thickness of 18.9 mm and a tensile strength of 17 MPa measured according to ISO 527 in the fully-crosslinked state using an extension rate of 250 mm/min and the screen comprises a layer 1.0 mm thick of a conventional fully-bonded screen composition and 69 soft annealed copper wires each 1.78 mm in diameter. The inner and outer layer of the sheath have thickness of 2.9 mm and 7.4 mm respectively and both are made of a thermoplastic polyethylene cable-sheathing composition with a tensile strength of 20 MPa measured according to ASTM D638, while the laminate has an aluminium base layer 0.2 mm thick and a coating of polyethylene 0.050 mm thick on each side; it is 230 mm wide and applied longitudinally so that its edges overlap by a minimum of 5 mm. This cable not only passes the impact test specified by CIGRE specification WG 21.14 (Elektra no.141, April 1992) using an impacting weight of 5 kg in the form of a 90° wedge with 2 mm tip radius dropped from a height of a metre, but still shows no substantial damage if the height is increased to 2 m.

What is claimed is:

1. An electric power cable having at least one metallic conductor, an insulation, and an earth screen enclosing the conductor and insulation, the earth screen having wires with gaps therebetween, the electric power cable comprising an external sheath including a first extruded polymeric layer which encloses the earth screen without filling the gaps, a second extruded polymeric layer enclosing the first extruded polymeric layer and a moisture barrier laminate located between and bonded to both the first and second polymeric layers, said moisture barrier laminate including a metal foil layer; and a polymeric material coated on each surface of the metal foil layer, the polymeric material contacting one of the first and second extruded polymeric layers and being compatible with a material of a contacted one of the first and second extruded polymeric layers.

2. The cable as claimed in claim 1 in which the first and second extruded polymeric layers of the sheath are of the same material and each surface of the laminate is coated with a single polymeric material which is the same as or compatible with the material of the first and second extruded polymeric layers.

3. The cable as claimed in claim 1 in which the first and second extruded polymeric layers of the sheath are of different but adhesively compatible material and each surface of the laminate is coated with a single polymeric material which is compatible with the material(s) of the first and second extruded polymeric layers.

4. The cable as claimed in claim 1 in which the first and second extruded polymeric layers of the sheath and the polymeric material on each surface of the laminate are all of
   (a) polyethylene,
   (b) polyvinyl chloride or
   (c) an "LSF" composition based on ethylene-vinyl acetate copolymer or an ethylene-propylene rubber, in each case with conventional additives.

5. The cable as claimed in claim 1 in which the laminate is longitudinally applied.

6. The cable as claimed in claim 1 in which the insulation of the cable is of a polymeric material.

7. The cable as claimed in claim 1 in which the gaps between the wires or strips of the earth screen are water-blocked.

8. The cable as claimed in claim 1 in which the gaps between the wires of the earth screen are waterblocked by applying water-swellable tapes under and over the wires.

9. The cable as claimed in claim 8 in which at least one semiconductive water-swellabe tape is applied under the wires and at least one insulating water-swellable tape over top of the wires.

10. An electric power cable having at least one metallic conductor, an insulation, and an earth screen enclosing the conductor and insulation, the earth screen having narrow tapes with gaps therebetween, the electric power cable comprising an external sheath including a first extruded polymeric layer which encloses the earth screen without filling the gaps, a second extruded polymeric layer enclosing the first extruded polymeric layer and a moisture barrier laminate located between and bonded to the first and second polymeric layers, said moisture barrier laminate including a metal foil layer; and a polymeric material coated on each surface of the metal foil layer, the polymeric material contacting the first and second extruded polymeric layers and being compatible with a material of a contacted first and second extruded polymeric layers.

11. The cable as claimed in claim 10 in which the first and second extruded polymeric layers of the sheath are of the same material and each surface of the laminate is coated with a single polymeric material which is the same as or compatible with the material of the first and second extruded polymeric layers.

12. The cable as claimed in claim 10 in which the first and second extruded polymeric layers of the sheath are of different but adhesively compatible material and each surface of the laminate are coated with a single polymeric material which is compatible with the material of the first and second extruded polymeric layers.

13. The cable as claimed in claim 10 in which the first and second extruded polymeric layers of the sheath and the polymeric material on each surface of the laminate are all of
   (a) polyethylene,
   (b) polyvinyl chloride or
   (c) an "LSF" composition based on ethylene-vinyl acetate copolymer or an ethylene-propylene rubber, in each case with conventional additives.

14. The cable as claimed in claim 10 in which the laminate is longitudinally applied.

15. The cable as claimed in claim 10 in which the insulation of the cable is of a polymeric material.

16. The cable as claimed in claim 10 in which the gaps between the narrow tapes of the earth screen are water-blocked.

17. The cable as claimed in claim 10 in which the gaps between the narrow tapes of the earth screen are water-blocked by applying water-swellable tapes under and over the narrow tapes.

18. The cable as claimed in claim 17 in which at least one semiconductive water-swellabe tape is applied under the narrow tapes and at least one insulating water-swellable tape over top of the narrow tapes.

* * * * *